Oct. 1, 1957   J. MÜLLER   2,808,270
WHEEL SUSPENSION FOR ROAD VEHICLES
Filed Nov. 9, 1953
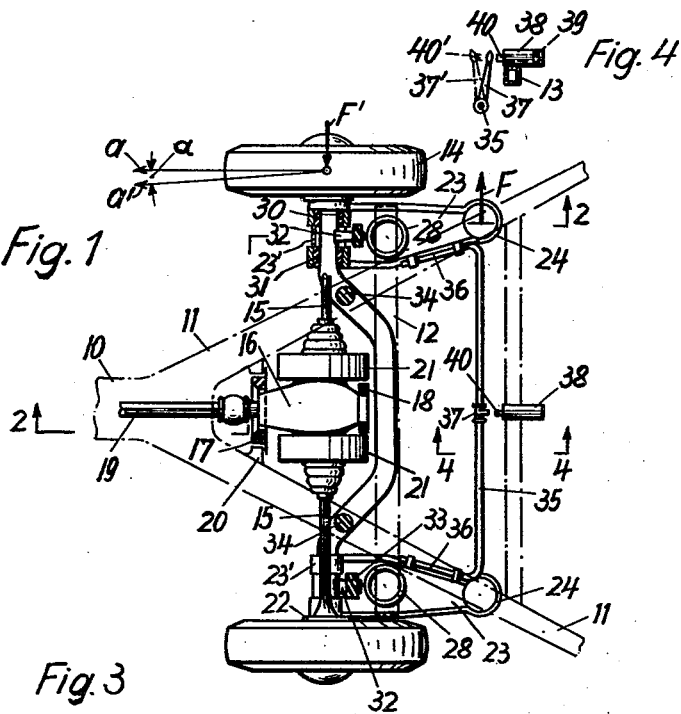
INVENTOR
JOSEF MÜLLER.
BY *Dicke and Craig.*
ATTORNEYS.

United States Patent Office 2,808,270
Patented Oct. 1, 1957

2,808,270

WHEEL SUSPENSION FOR ROAD VEHICLES

Josef Müller, Stuttgart, Germany, assignor to Daimler-Benz Aktiengesellschaft, Stuttgart-Unterturkheim, Germany Application November 9, 1953, Serial No. 390,980

Claims priority, application Germany November 11, 1952

14 Claims. (Cl. 280—124)

The present invention relates to improvements in a wheel suspension, and especially to the suspension of the driven rear wheels of a motor vehicle. More particularly, the invention relates to the suspension of the rear wheels of a motor vehicle, the wheel carriers of which are resiliently supported relative to each other by a common axle and provided with arms which pivot in a longitudinal direction of the vehicle and preferably are resiliently mounted on the vehicle frame.

It is an object of the invention to devise an improvement of a rear wheel suspension of the type described, particularly for the purpose of preventing a possible loss of control of the vehicle in a curve which may be caused by the fact that the vehicle sometimes drives through a curve not along the radius corresponding to the turning angle of the steering wheel but at a much larger radius, resulting in a very difficult steering especially in sharp curves.

A feature of the invention therefore consists in providing such a resilience about a vertical axis between the wheels and the pivoting arms or links on which the wheels are mounted, and in thus resiliently connecting the pivoting arms to the vehicle frame, preferably by means of rubber cushions or packings having a vertical axis, that the centrifugal forces acting upon the vehicle, for example, in driving through a curve, will automatically produce a counterforce which acts upon the pivoting arms and the wheels to turn the latter toward the inside of the curve. Thus, the adjustment of the wheels toward the inside by the action of the centrifugal force produces an inwardly directed "floating angle" which partly or entirely counteracts and overcomes the tendency of the vehicle in a curve to be thrown out of control, and thus improves the qualities of the vehicle to stay properly within the curve.

Another feature of the invention consists in the provision of bumpers or cushions for suspending the wheel axle so as to be resiliently supported in the direction of rotation of the wheels and relative to the wheels or the members carrying the same, as well as to the pivoting arms which are fixedly secured to the wheel carrying members.

The advantage of such a wheel suspension consists in an increased stability thereof. The bumpers or cushions will, on the one hand, prevent the rear axle, which may be bent in a substantially U-shape to curve around the differential or other driving gear, from tilting about its axis transverse to the direction of driving, and, on the other hand, they will, when the wheels are moving in a direction vertically opposite to each other and when the pivoting arms thus pivot in opposite directions, produce a spring action which tends to return the axle and wheels to their normal position.

According to one preferred embodiment of the invention, the resilient suspension of the axle relative to the pivoting arms consists of a socket-like mounting of one of these elements within the other, a resilient cushion or cushions interposed in such socket between the axle and each pivoting arm, and the interconnected portions of these elements being made of a non-circular cross section so as to prevent relative rotation or tilting thereof.

According to another embodiment of the invention, the inner one of the members which are mounted within each other, that is, for example, the axle, is provided at each end with a suitable lever which rests upon a portion of the repective outer member, for example, the pivoting arm, with resilient bumpers or cushions interposed between each lever and the respective outer member for counteracting the tendency of the axle to tilt or rotate.

Another important feature of the invention consists in the provision of means for also utilizing the stabilizer for resiliently taking up or counteracting vertical movements of the wheels. This feature is of special advantage for opposing the shifting of the load or weight of the vehicle, especially when driving in sharp curves.

Further objects, features, and advantages of the invention will appear from the following detailed description thereof and the appended drawings, in which Fig. 1 is a top view of the wheel suspension according to the invention, partly in cross section;

Fig. 2 is a side view of the suspension, partly in a section taken along line 2—2 of Fig. 1;

Fig. 3 is a front view of approximately one half of the suspension;

Fig. 4 is a cross section along line 4—4 of Fig. 1; while

Figs. 5 and 6 show two modifications of the resilient mounting of the axle in a cross section similarly as taken along line 2—2 of Fig. 1.

Referring to Fig. 1, the main frame which is in the form of a central supporting girder 10 branches off at its rear end in two forklike arms 11 which are interconnected by transverse beams 12 and 13. The rear wheels 14 on shafts 15 are driven by a differential or similar driving gear 16 which is resiliently supported toward the rear by a rubber gasket 18 so as to be resiliently mounted about an axis coinciding with the longitudinal axis of the vehicle. For supporting the gear 16 at the front, the rubber gasket 17 is mounted within an annular bracket 20 which is directly secured to, and preferably integral with, the frame arms 11, while the rear rubber gasket 18 is mounted in a suitable supporting structure on the transverse beam 12. For braking the wheels, brake drums 21 are provided on the gear 16 in a customary manner.

The wheel carriers 22 of the driven wheels 14 are fixedly secured to the pivoting arms or links 23 by means of tubular sockets 23' provided on arms 23 so that they together turn about the pivots 24 of the arms 23, which are mounted on the frame arms 11. The pivoting arms 23, which are of a substantially U-shaped cross section and open at their upper side, are for this purpose supported on annular rubber cushions 25 which are secured by covers 26 to brackets 27 on the frame arms 11 so as to depend vertically therefrom. Thus, the pivoting arms 23 are able to yield in every direction. For resiliently supporting the pivoting arms 23 relative to the frame arms 11, coil springs 28 are provided which are resting upon the ends of the transverse beams 12.

The two wheel carriers 22 and the respective tubular ends or sockets 23' of the pivoting arms 23 are supported relative to each other by an axle 29 which is mounted by rubber cushions 30 and 31 in the tubular parts 23' of the pivoting arms 23 to provide an essentially axial alignment of the two wheel carriers 22. The axle 29 has substantially the shape of a crankshaft with its central rearwardly extending portion passing around the gear 16. As a result of such bent shape, and under the weight of the rearwardly extending portion, the axle 29 has the tendency to turn downwardly. Such tendency is overcome in the embodiment of the invention shown in Figs, 1 to 3 by a lever 32 extending rearwardly from the axle 29 and supported by rubber cushions 33 on the respective pivoting arm 23.

For limiting the stroke of the springs 28 and the resilience of the wheels 14 and the axle 29, rubber bumpers or cushions 34 are provided on the axle 29, which, when the wheels exceed a certain upward stroke, resiliently press against the frame arms 11.

The pivoting arms 23 are further connected to a torsion stabilizer 35. For this purpose, the ends 36 of the torsion rod are bent at a right angle and secured by suitable connecting members to the pivoting arms 23. The transverse main part of the stabilizer extends substantially in the direction of the rotary axis formed by the pivots 24 of the arms 23. As shown especially in Fig. 4, the torsion rod 35 is provided at its center with a lever 37 which normally is able to reciprocate freely.

Within the pivotal plane of the lever 37 and on the transverse beam 13 of the frame is mounted a cylinder 38 containing a piston 39 with a piston rod 40 thereon, which is controllable, for example, by hydraulic means, from the driver's cab. In the position shown in Fig. 4, the piston rod 40, which operates as a stop for the lever 37, is retracted from the pivoting range of the lever 37. However, if desired, it may be advanced to the position 40', indicated in dotted lines in Fig. 4.

The operation of the wheel suspension according to the invention and as described above is as follows:

When the wheels 14 move upwardly in the same direction, such movement or upward thrust is normally taken up only by the springs 28, since the stabilizer 35 with the lever 37 participates in such movement without exerting any spring action of its own. The lever 37 then pivots freely about the axis of the torsion rod 35 without coming in contact with the stop 40. When the wheels 14 move vertically in opposite directions or when the frame arms 11 or the body of the vehicle are at an inclined position relative to the ground, one end 36 of the stabilizer is bent upwardly and the other end downwardly. The stabilizer then acts in a manner known as such as a supplementary spring to take up the oppositely directed vertical movements of the wheels. However, by advancing the stop 40, the stabilizer 35 may also exert a supplementary retarding force upon equally directed upward movements of the wheels. Thus, beyond the free stroke of the lever 37, the extent of which is determined by the adjustable stop 40, each side of the stabilizer 35 will act as a spring supplementary to the main spring 28, and by advancing the stop 40 to its most forward position, for example as shown at 40', the entire resilience of the stabilizer 35 may be used to supplement and increase the force of the main spring 28.

An additional stabilizing effect will be obtained, as already described, by the rubber cushions 33 between the axle 29 and the pivoting arms 23.

Simultaneously therewith, the centrifugal force F, which is produced by the weight of the upper structure of the vehicle when driving through a curve and transmitted through the respective pivot 24 to that pivoting arm 23 which is lying in the outward direction of such curve, and which produces a counterforce F' at the point of contact of the wheel with the road, produces a torque which tends to turn the pivoting arm together with the wheel 14 thereon about a vertical axis whereby the wheel is turned from the direction of driving $a$ toward the direction $a'$ about an angle $\alpha$. Such angularly shifted position of the wheel 14 toward the inside of the curve opposes any tendency of the vehicle to be thrown out of control in the curve and improves its road-keeping qualities considerably. The degree of such angular shifting of the wheels 14 depends upon the resilience of the pivoting arms 23 in the rubber cushions 25, as well as the resilience of the rubber cushions 30 and 31 which connect the axle 29 with the pivoting arms 23 and the wheel carriers 22, the pivoting arms 23, the wheel carriers 22 and the sockets 23' being connected rigidly with each other in any suitable manner.

In the embodiment of the invention shown in Fig. 5, the portions of the axle 29 adjacent to the pivoting arms 23 are made of hexagonal shape or cross section 129 corresponding in shape to that of the cross section 123 of the sockets 23' of the pivoting arms 23 and of the intermediate rubber packing 130.

In the embodiment of the invention shown in Fig. 6, the portions of the axle 29 adjacent to the pivoting arms 23, as well as the sockets 23' of the pivoting arms and the intermediate rubber packing 230 are of oval cross section. If these elements are made of a cross section as shown by either Fig. 5 or Fig. 6, the torque which is transmitted to the axle 29 is taken up by such non-circular elements, and special bracing means, such as the levers 32 as shown in Figs. 1 and 2, may be omitted. Obviously, these elements may also be made of a cross sectional shape different from those shown in Figs. 5 and 6, or the torque between the pivoting arms 23 and the axle 29 may be taken up by different means than those shown in the drawings. Also, the structure shown in Figs. 5 and 6 may be combined with the structure shown in Figs. 1 and 2, and the non-circular portions of the axle may be provided with a lever 32 which is resiliently mounted between rubber cushions 33.

The wheel suspension as above described is of a very simple and inexpensive design, and it complies with the utmost requirements of operation.

Obviously, when speaking in the above description and in the claims of a frame, it is to be understood that this term is to include a self-supporting body structure.

While I have described my invention with reference to a preferred embodiment thereof, I wish it to be expressly understood that my invention is in no way limited to the details of such embodiment but is capable of numerous modifications within the scope of the appended claims.

What I claim is:

1. In combination with a vehicle having a frame, a pair of wheels, means for supporting said wheels at opposite sides of said frame, means for suspending said wheels on said frame comprising a pivoting arm at each side of said frame fixedly secured to said wheel supporting means, means for resiliently connecting each of said pivoting arms to said frame so as to pivot about a horizontal axis and also provide a limited resilient movement of said pivoting arms about a vertical axis and relative to said frame, said resilient connecting means being positioned only rearwardly of the center of said wheels as seen in the normal driving direction of the vehicle, an axle member intermediate said wheels, and means for resiliently connecting said axle member to said wheel supporting means so as to provide a limited flexibility of said axle member relative to said wheel supporting means and said pivoting arms.

2. A combination as defined in claim 1, wherein the wheel supporting means include a hollow hub-like member adjacent each wheel and directed toward the longitudinal center of the vehicle, each of said hub-like members also forming the front part of the respective pivoting arm, and at least one rubber cushion intermediate each pivoting arm and hub-like member.

3. A combination as defined in claim 1, further including means for resiliently supporting the axle member relative to the pivoting arms in the direction of rotation about the axis of said axle member.

4. A combination as defined in claim 1, wherein the last mentioned resilient connecting means comprise at least one non-circular packing of rubberlike material intermediate the axle member and each of said wheel supporting means, and retaining parts on said axle member and said wheel supporting means cooperating with said non-circular packing for resiliently securing the axle member in a fixed position relative to the wheel supporting means.

5. In combination with a vehicle having a frame, a pair of wheels, means for supporting said wheels at opposite sides of said frame, means for suspending said wheels on said frame comprising a pivoting arm at each side of said frame fixedly secured to said wheel supporting means, means for resiliently connecting each of said pivoting arms to said frame rearwardly of said wheels, an axle member intermediate said wheels, means for resiliently connecting said axle member to each of said wheel supporting means in the direction of rotation about the axis of said axle member, and means for resiliently supporting said axle member and wheel supporting means for limiting the rotary movement of said axle member relative to said wheel supporting means.

6. A combination as defined in claim 1, wherein the central part of the axle member is bent toward one side relative to the ends thereof connected to the wheel supporting means.

7. A combination as defined in claim 5, wherein the central part of the axle member is bent toward one side relative to the ends thereof connected to the wheel supporting means.

8. In combination with a vehicle having a frame, a pair of wheels, means for supporting said wheels at opposite sides of said frame, means for suspending said wheels on said frame comprising a pivoting arm at each side of said frame and fixedly secured to said wheel supporting means, means for pivotally connecting each of said pivoting arms to said frame so as to pivot about an axis transverse to the direction of driving including elastic means to provide a resiliency for said pivoting arms also about a vertical axis, a stabilizer connecting the two pivoting arms and positioned substantially within said axis, stop means on said stabilizer, and stop means on said frame, said stop means being spaced from each other when the axle member is in a normal horizontal position, and being in contact with each other when said stabilizer is turned about its axis by a certain movement of both wheels in a vertical direction.

9. In combination with a vehicle having a frame, a pair of wheels, means for supporting said wheels at opposite sides of said frame, means for suspending said wheels on said frame comprising a pivoting arm at each side of said frame fixedly secured to said wheel supporting means, means for resiliently connecting each of said pivoting arms to said frame so as to pivot about a horizontal axis and also provide a limited resilient movement of said pivoting arms about a vertical axis and relative to said frame, said resilient connecting means being positioned at the rear of the center of said wheels as seen in the normal driving direction of the vehicle, an axle member intermediate said wheels, means for resiliently connecting said axle member to said wheel supporting means so as to provide a limited flexibility of said axle member relative to said wheel supporting means and said pivoting arms, and a torsion stabilizer intermediate said pivoting arms and connecting the same, said stabilizer being positioned substantially in line with the pivotal axis of the means for connecting the pivoting arms to the vehicle frame.

10. In combination with a vehicle having a frame, a pair of wheels, means for supporting said wheels at opposite sides of said frame, means for suspending said wheels on said frame comprising a pivoting arm at each side of said frame fixedly secured to said wheel supporting means, means for resiliently connecting each of said pivoting arms to said frame so as to pivot about a horizontal axis and also provide a limited resilient movement of said pivoting arms about a vertical axis and relative to said frame, said resilient connecting means being positioned at the rear of the center of said wheels as seen in the normal driving direction of the vehicle, an axle member intermediate said wheels, means for resiliently connecting said axle member to said wheel supporting means so as to provide a limited flexibility of said axle member relative to said wheel supporting means and said pivoting arms, a torsion stabilizer intermediate said two pivoting arms and connecting the same, said stabilizer being positioned substantially in line with the pivotal axis of the means for connecting the pivoting arms to the vehicle frame, and stop means for limiting the movement of said stabilizer positioned at a central point of the length thereof so that, when the wheels are in a substantially normal position, the stop means are spaced from said stabilizer, said stop means only limiting the further movement of the stabilizer when the latter is turned about its axis by a certain movement of both wheels in a vertical direction.

11. A combination as defined in claim 10, further including means for adjusting said stop means so as to vary the extent of said movements of the stabilizer.

12. In combination with a vehicle having a frame, a pair of wheels, means for supporting said wheels at opposite sides of said frame, means for suspending said wheels on said frame comprising a pivoting arm at each side of said frame fixedly secured to said wheel supporting means, means for pivotally connecting each of said pivoting arms to said frame so as to pivot about an axis transverse to the direction of driving including elastic means to provide also a resiliency for said pivoting arms about a vertical axis, a stabilizer connecting said two pivoting arms positioned substantially coincidentally with said axis, and means at said stabilizer for limiting the resiliency of said pivoting arms about the vertical axis.

13. The combination according to claim 12 wherein said last-mentioned means comprise an end of said stabilizer bent essentially in the direction of the corresponding pivoting arm and means for securing said bent end at said last-mentioned pivoting arm.

14. In combination with a vehicle having a frame, a pair of wheels, means for supporting said wheels at opposite sides of said frame, means for suspending said wheels on said frame comprising a pivoting arm at each side of said frame fixedly secured to said wheel supporting means, means for resiliently connecting each of said pivoting arms to said frame so as to pivot about a horizontal axis and also provide a limited resilient movement of said pivoting arms about a vertical axis and relative to said frame, said resilient connecting means being positioned only rearwardly of the center of said wheels as seen in the normal driving direction of the vehicle, an axle member intermediate said wheels, means for resiliently connecting said axle member to said wheel supporting means so as to provide a limited flexibility of said axle member relative to said wheel supporting means and said pivoting arms, said wheel supporting means including a hollow hublike member adjacent each wheel and directed toward the longitudinal center of the vehicle, each of said hub-like members also forming the front part of the respective pivoting arm, and at least one rubber cushion intermediate each pivoting arm and hub-like member, a lever secured to said axle member within said hub-like member and cushioning elements operatively engageable by said lever for resiliently supporting the axle member relative to the pivoting arms in the direction of rotation about the axis of said axle member.

References Cited in the file of this patent

UNITED STATES PATENTS

| 1,757,839 | Keck | May 6, 1930 |
| 2,226,047 | Borgward | Dec. 24, 1940 |
| 2,256,069 | Wagner | Sept. 16, 1941 |

FOREIGN PATENTS

| 171,468 | Austria | June 10, 1952 |
| 1,014,656 | France | Aug. 20, 1952 |